Dec. 26, 1950 G. J. A. BASSEREAU 2,535,622
PRODUCTION OF METAL FROM ITS ORE
Filed July 10, 1946 2 Sheets-Sheet 1

INVENTOR.
GEORGES JULES AUGUSTE BASSEREAU

BY

Dale A. Bauer
ATTORNEY.

Dec. 26, 1950         G. J. A. BASSEREAU        2,535,622
PRODUCTION OF METAL FROM ITS ORE
Filed July 10, 1946                              2 Sheets-Sheet 2
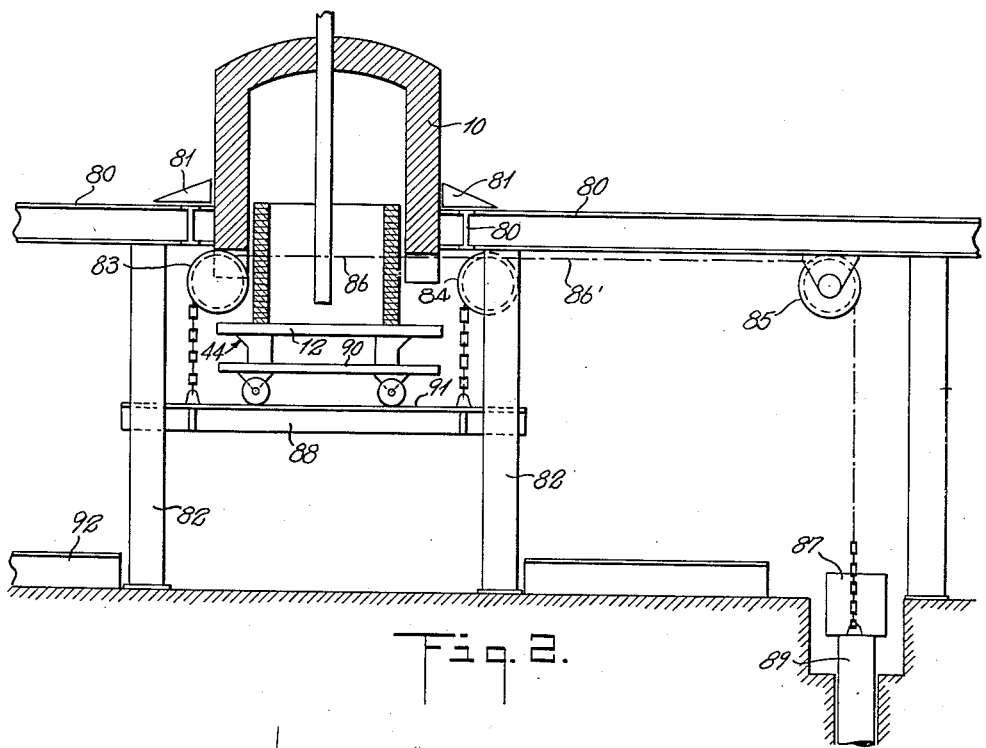
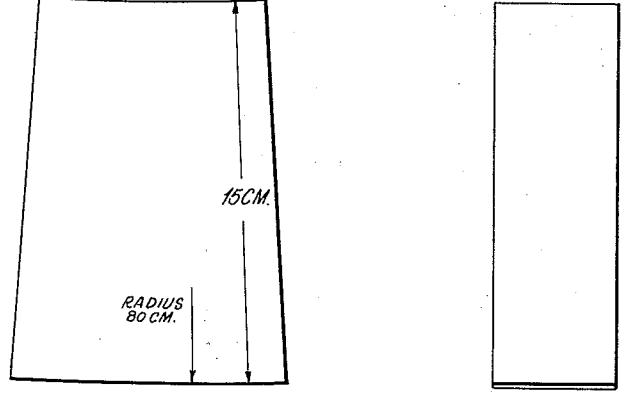
INVENTOR.
Georges Jules Auguste Bassereau
BY
Dale A. Bauer
ATTORNEY

Patented Dec. 26, 1950

2,535,622

UNITED STATES PATENT OFFICE 2,535,622

PRODUCTION OF METAL FROM ITS ORE

Georges Jules Auguste Bassereau, Paris, France, assignor to Societe d'Etudes pour L'Industrie du Magnesium, Paris, France Application July 10, 1946, Serial No. 682,460
In France July 12, 1941

Section 1, Public Law 690, August 8, 1946
Patent expires July 12, 1961

8 Claims. (Cl. 75—10)

My invention refers to the thermal treatment of solid materials, to the electro-thermal release of metal from its ore, and particularly to the elaboration of magnesium by reduction of its ores. The invention will be described in its relation to the elaboration, or release, of magnesium, but that description is only illustrative, not a limitation.

The release of magnesium from its ores by reduction requires high temperatures, on the order of 1000° C. to 1300° C.; consequently, the problem of a good utilization of the developed heat is of the greatest importance. In the usual technique for elaborating magnesium by known means, the furnace charge is composed of the ore mixed with a reducing agent such as ferrosilicon; agglomerates are made with that mixture and subjected to a thermal treatment at a temperature sufficient to reduce the ore and release the metal. But until now it was difficult to bring those agglomerates to a uniform temperature so that the reduction process was uneven and frequently incomplete. That was partly due, according to our discovery, to the position of the agglomerates in respect to one another, or because of the position of the heating means in relation to the treated material.

It is an object of the invention to practice the art of releasing metal from its ores in such a manner that the metal will be wholly, evenly, and completely released therefrom, or substantially so.

It is a particular object of the invention to subject all parts of an ore charge to substantially equal heat.

Another object of the invention is to so separate the ore charge from the heating element that all parts of the charge will be subjected to substantially identical temperature conditions.

Another object of the invention is to eliminate voids in an ore charge in order to eliminate the insulating effect caused by such voids.

Another object of the invention is to obtain an even temperature gradient throughout the thickness of a charge of ore.

The objects of the invention are accomplished generally speaking by forming agglomerates of the ore, by compressing it into briquettes, bricks, or blocks, and by arranging the briquettes in such relation to the source of heat, that they constitute a compact bed or wall preferably having a thickness of only one row or tier of blocks, the thickness of the wall being comparatively small in relation to the distance of the wall from the heating source, so that local overheating of the face of the wall is avoided and the temperature throughout the wall has a substantially constant gradient.

In a preferred form of the invention, a vertically arranged, linear electrical resistor is employed and a cylindrical wall of briquettes is built up thereabout by the use of trapezoidal blocks having radially aligned ends. In this way, the entire wall is substantially equidistant from the heating element and receives a uniform thermal treatment. Furthermore, the wall itself may thus be made dense and without insulating voids. In order to conserve current, it is advantageous under some circumstances to pre-heat the wall to a temperature below that at which reduction occurs before it is subjected to the energy of the electrical resistor.

My invention is further characterized by a new type of furnace having an elevator platform, and by a novel electrode structure well adapted to aid in the accomplishment of the objects of the invention. Other objects, novel features, and characteristics of the invention will be further set forth as the description proceeds.

The efficiency of my process results in particular from the fact that, as the load is constituted throughout its thickness by only one row of agglomerates, it does not present any gap which would be prejudical to a satisfactory transmission of the heat, and that the heat flows continuously as desired throughout the mass.

Moreover, owing to the special shape and size of the load, the heat in its path from the inside face to the outside face, flows through a practically constant section, so that although the temperature falls along such a path, such fall presents a gradient which is constant. Therefore, there are not produced on the inside face those excessive temperatures which occur in some known processes where the area of the face directly exposed to the heating device is notably smaller than the area of the exit face, the temperature gradient being in this latter case much higher in the zone of the inside face than in the zone of the outside face.

In practice good results are obtained when the average distance from the charge to the heating source is 8 to 10 times greater than the thickness of the charge. However, within the scope of the invention, satisfactory results may be obtained with smaller proportions, for instance, where the distance from the load to the heating source is larger than 4 or 5 times the thickness of the load.

Referring to the elements constituting the load, the more easily obtainable shapes will be chosen and particularly that of briquettes. Such briquettes may be produced, for instance, in molds where the mixture to be heated, after having been brought to the powdered state and mixed when necessary or desirable with a binder, is submitted to a suitable pressure. A particularly desirable shape is that of a trapezoid which has base angles such that the sides thereof are radially directed.

A single source of heat of any satisfactory type may be employed, or the sources may be multiple, care being taken in each instance that the arrangement of the charge and the other factors involved in the reduction conform to the principles set forth herein. A preferred embodiment of the invention is characterized by surrounding a souce of heart with a wall of agglomerates which constitutes an enclosure, the shape of which may vary according to the general principles herein disclosed. For instance, it may be cylindrical, it may have the form of a truncated cone, or any other shape provided the briquettes are constructed in such a manner that the desired shape can be produced efficiently in relation to the heating unit employed. A cylindrical wall in general offers the simplest and most satisfactory structure. When the enclosure made of agglomerates constitutes a cylindrical surface having a vertical axis, the heating device will be constituted by a graphite rod acting as an electrical resistor vertically placed in the furnace. The best shape to be given to the enclosure is then the shape of a cylinder in the axis of which the graphite rod is placed.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Fig. 2 is a diagrammatical elevational view of the total apparatus.

Fig. 3 is a plan view of a scale drawing of a briquette of satisfactory size.

Fig. 4 is an elevational view of the briquette of Fig. 3.

Figure 1:
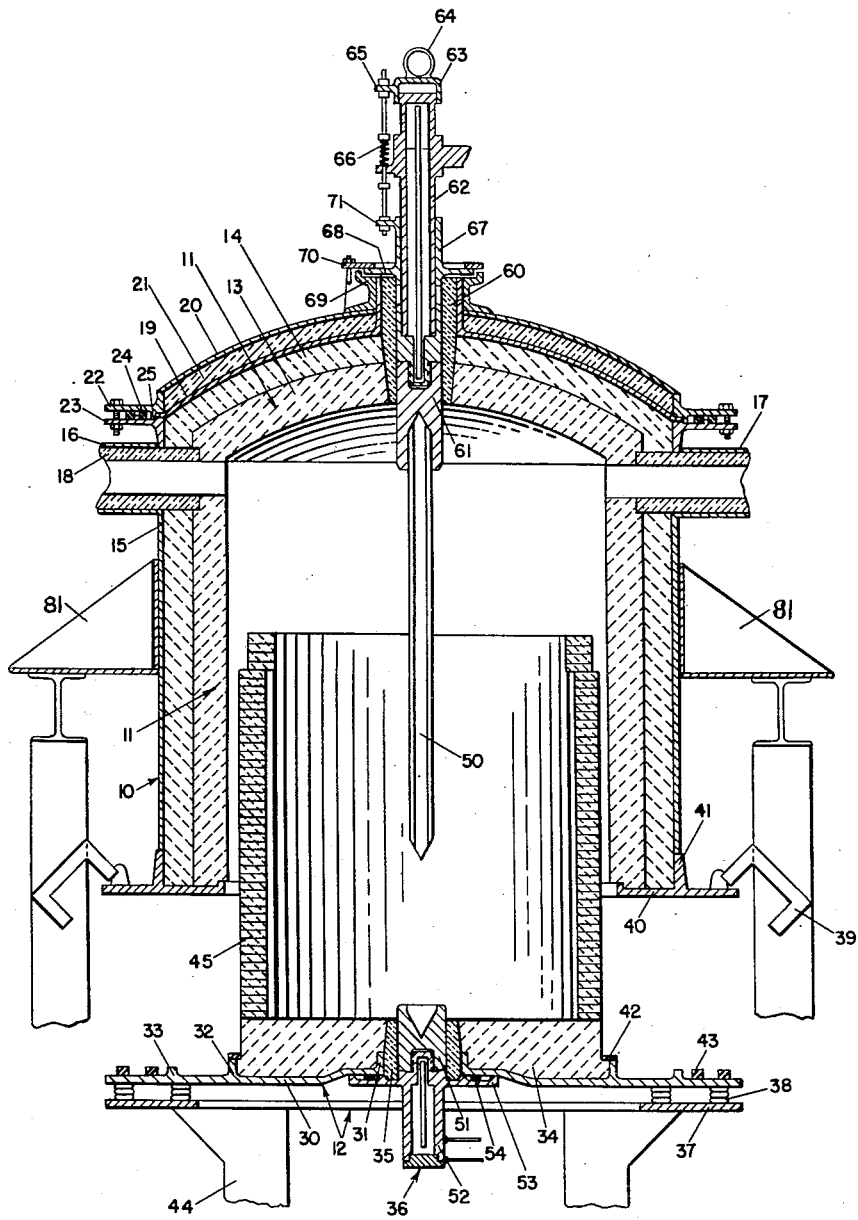
Fig. 1 is a vertical diametrical section through a furnace constructed in accordance with the new principles of the invention.

In the drawings, Figures 1 and 2, is shown a preferred form of furnace embodying the principles of the invention. This furnace is essentially characterized by being separable into two parts, the upper of which comprises a dome appropriately lined with refractory material, and the lower part of which constitutes a platform having a refractory block that completes the lining of the chamber when the platform is in sealed relation thereto, and upon which there can be built a briquette wall of the type described. This bottom may be mounted upon an elevator so that it and its load may be removed from the dome and transported from place to place with facility. By this means it is possible to pre-heat the briquette wall in a heating chamber separate from that wherein the reduction is to take place. In this way a valuable increase in efficiency may be obtained which was not possible with previous structures. The charge after reduction tends to maintain its form, when the briquettes are properly made, so that the invention also comprises a unique and simple method of charging and discharging a metallurgical furnace.

In the preferred embodiment of the invention, the furnace comprises a cylindrical dome having a movable bottom constituted by a circular platform having a size adapted to close the chamber. A graphite resistor is adapted to be fixed along the axis of the chamber. The construction of the electrodes and the manner in which contact is secured and maintained also involves elements of novelty. In Figure 1 of the drawing, a furnace is generally indicated by the numeral 10 and is comprised of a dome 11 and a platform 12. The dome has an inner refractory lining 13, an outer refractory lining 14, and a metal wall 15 provided with a plurality of outlets 16, 17, which are lined with insulation 18. These outlets may be considered generally as communicating with condensers under vacuum. This furnace is particularly adapted to the release and obtaining of magnesium from its ores, which is preferably carried out under conditions that maintain the magnesium within the furnace in the vapor phase, in which state it can be readily withdrawn through openings such as 16 and condensed under suitably adjusted conditions. A metallic wall 19 rests upon the side wall 15 of the dome and is clamped in position there by an outer wall 20. Insulation 21 fills the space between the walls 19, 20. Flanges 22, 23 on the cover 20 and the side wall 15 serve to join the parts together, and a suitable gasket 24 serves to prevent the accidental escape of any fumes that may pass the flange 25 that overlaps the joint between the side wall 15, the intermediate wall 19 and the cover 20. The bottom or platform of the furnace is comprised of a solid member 30 having a series of annular flanges 31, 32, 33. Between the flanges 31 and 32 a block 34 of refractory material is constructed. This block is conically shaped above the flange 31 to receive a guide 35, which has a similar shape, and movably receives the electrode which is generally indicated by the numeral 36. Beneath the platform member 30 is an annulus 37 upon which are mounted a series of springs 38. When the platform is elevated fully so as to close the furnace, the pivoted clamps 39 are swung into position beneath member 37 forming a base upon which springs 38 may exert their pressure to force the platform 30 into sealing relation with the bottom of the dome. The bottom of the dome is comprised of an annular plate 40 having flange 41 to which the side members 15 are attached, and to appropriate places along hte outside of which are pivoted the clamps 39. The flange 33 is so dimensioned that it makes contact under the thrust of springs 38 with the bottom of plate 40 while the outer rim of plate 30 compresses gaskets 43 and the flange 32 compresses gasket 42.

An elevator is diagrammatically indicated by the numeral 44. The dome 10 is supported on girders 80 by angle brackets 81. These girders are supported by uprights 82. Suspended from the girders 80 are pulleys 83, 84, 85, over which chains or cables 86—86' are trained and attached to weight 87 at one end and to beams 88 of the elevator 44 at the other. Weight 87 is heavy enough to raise elevator 44 and its load. A hydraulic press 89 suffices to raise the weight 87 and lower the elevator and its loaded platform 12.

The elevator platform 12 is supported by legs which rest upon a truck 90 having flanged wheels riding on tracks 91 supported by the elevator beams 88. When the elevator is at its lowest position the tracks 91 are aligned with tracks 92 and the truck and its load can be wheeled away along tracks 92, another loaded truck being wheeled onto elevator tracks 91.

In Figure 1 there is shown, as indicated by the numeral 45, a cylindrical wall built of briquettes. This wall is composed of a single thickness of briquettes, each of which is of trapezoidal shape having axially aligned ends. Thus each course of bricks forms in effect a circle presenting a substantially continuous face to the heat emitted by the resistor 50.

A single briquette is shown in Figs. 3 and 4. It is trapezoidal and when assembled with other briquettes of the same size will construct a cylinder with a thickness of 15 centimeters and an exterior radius of 80 centimeters. By piling 20 layers the cylinder will have a height of 1 meter.

It will be perceived that the surface exposed directly to the heat emitted by the resistor is very great in comparison to the surface similarly subjected to direct heat action in the practice of the prior art. This surface is very great in comparison with the mass of the ore in the furnace. Consequently, satisfactory results are achieved with increased efficiency.

An electrode 51 is mounted within the guide 35. This electrode is an electrical connection with a supporting member 52 having an annular flange 53 that is engaged in sealing relation with the bottom of member 30, which is slightly recessed to accommodate it. A gasket 54 serves to prevent the escape of vapors from within the furnace at this joint.

In the dome there is provided a similar guide 60 within which the electrode 61 is adapted to be moved. This electrode is attached to a movable tubular member 62 which has at its upper end a cap 63, a ring 64 for the application of lifting means, and three apertured ears 65 symmetrically arranged in respect of the vertical axis and to which are attached springs 66. A tubular member 67 is mounted by means of a flange 68 between cooperating members 69 and 70 which are connected to each other and to the top 20 of the dome. Ears 71 serve for the attachment of the lower end of springs 66. Owing to such construction, the electrode may move axially under the effect of the resistor expansion, while springs 66 prevent any eventual squash of the lower end of the resistor, in contact with electrode 51, under the effect of the atmospheric pressure. The resistor is preferably permanently mounted in the upper electrode 61, for instance by screw threading or by other satisfactory means. At its other end, it is provided with bevels adapted to fit the interior bevels or cone of the lower electrode 51. The cone of the lower electrode is sufficiently wide at the top to serve as a guide for the lower end of the resistor when the parts are being placed in position. The current conductors through which current is supplied to the upper electrode 62 may be of any type having sufficient flexibility to permit the movement allowed by spring 66 when contact is made between heater element 50 and seat 51.

In the practice of this art, the platform is separated from the furnace and brought to another place where an enclosure of agglomerates is erected thereon, the shape of the enclosure corresponding to the shape of the furnace, in this case cylindrical.

When the charge has been erected the platform is conveyed to any auxiliary apparatus that may be useful, for instance to a pre-heating furnace wherein the temperature of the charge is raised by any suitable heating means to one approaching that at which reduction of the charge commences. Thereafter, the charge is inserted in the furnace by means of a hydraulic or other type elevator, the enclosure is completed, the electrode is fitted, and the reduction of the ore takes place. The vacuum required for the reduction is obtained by means of apparatus connected to the condensers, but a supplementary vacuum connection may be provided at the interval between the seals to improve the tightness of the furnace. The agglomerates harden during the preheating of the reduction and can be easily removed after the reduction.

*Example*

The following mixture is prepared:

| | Per cent |
|---|---|
| As magniferous ore: calcined dolomite | 79 |
| As a reducer: ferrosilicon with 75% Si | 18 |
| As a catalyst: fluorspar | 3 |

Such mixture is molded by compression under 1200 to 1300 kg. sq. cm. into briquettes of trapezoid shape, 7 cm. thick, their horizontal surface beng a trapezium having a height of 15 cm. and an area of 150 sq. cm. Their specific gravity is 2 to 2.2.

Such briquettes are used for constituting a wall which is 160 cm. high, has an inside diameter of 140 cm., and is 15 cm. (one briquette) thick. The heating resistance is thus placed at 70 cm. from the wall. It is heated for 4 hours at 1250° C.

The rate of extraction is 92 to 94% of the magnesium contained in the briquettes.

The process affords a particular advantage in offering a very large heating surface for the ore agglomerates, being particularly large in comparison with the surface presented in the prior art processes and resulting in increased efficiency.

Another advantage of the invention is in the ability which is obtained by this invention to pre-heat the charge by means other than those employed for the final operation.

Another advantage and one from which a considerable portion of the increased efficiency springs is in the construction of the novel briquettes, the shape of which permits the construction of agglomerate enclosures about the heating means.

It must be noted that, instead of the above described axial resistor supported by two electrodes which are solidary the one with the dome, the other one with the platform of the furnace, there may be used a vertical U-shaped resistor also placed in the axis of the furnace and supported by electrodes both fixed to the dome of the furnace. Owing to such arrangement, no special means are required for ensuring the operation for control of the position of the resistor in the electrodes and no current leads are required for the movable platform which only serves for bearing the load.

As many apparently widely different embodiments of this invention may be made without departing from the spirit and scope thereof, it is to be understood that I do not limit myself to the specific embodiments thereof except as defined in the appended claims.

What is claimed is:

1. A metallurgical furnace comprising a cylindrical dome having a refractory lining adapted to serve as a metallurgical reduction chamber, a platform having a refractory block adapted to support a cylindrical charge and to complete the refractory lining of the reduction chamber, electrodes carried by dome and platform, a resistor carried by one electrode and adapted to make contact with a conical socket in the other electrode when the dome is closed by the platform, means to seal the joint between dome and platform, elevator means to move the platform to and away from the dome, and means to supply current to the electrodes.

2. A metallurgical furnace comprising a cylindrical dome adapted to serve as a metallurgical chamber, a platform adapted to support a charge and to complete the reduction chamber, electrodes carried by dome and platform, a resistor carried by one electrode and adapted to make contact with the other electrode when the dome is closed by the platform, means to seal the joint between dome and platform, means to move the platform to and away from the dome, and means to supply current to the electrodes.

3. A metallurgical furnace comprising a cylindrical dome adapted to serve as a metallurgical chamber, a platform adapted to support a charge and to complete the reduction chamber, electrode carried by the dome, a resistor carried by the electrode, means to seal the joint between dome and platform, means to move the platform to and away from the dome, and means to supply current to the resistor.

4. A metallurgical furnace including a vertical, cylindrical, refractory dome having ducts for the escape of metal and an insulated crown, an electrode contact centrally penetrating the dome of the furnace, said contact being yieldable to absorb the motion of the electrode in contact with the opposed electrode contact, a refractory elevator platform, said platform having sealing means for cooperation with the dome and having a cooperating, centrally located electrode contact.

5. The art of reducing an ore of a metal which is obtained at reducing temperature as a vapor that includes the steps of constructing from the ore and a reducing agent a structure substantially free from voids having its ore-containing parts substantially equidistant from a linear source of heat, heating said structure by a source of sufficient intensity to raise the ore to reducing temperature and at such a distance therefrom that the temperature falls within the structure at a gradient that is substantially constant.

6. The art of reducing a metal which is obtained at reducing temperature as a vapor from its ore that comprises arranging flat briquettes containing the ore and a reducing agent around a heating element in a cylinder of thin wall section, the distance of the cylinder from the heating element being at least 4 times the thickness of the cylinder wall, and heating the element to a temperature at which the ore is reduced in the briquettes.

7. The art of reducing a metal which is obtained at reducing temperature as a vapor from its ore that comprises arranging flat briquettes containing the ore and a reducing agent in a cylinder substantially free from voids around a linear heating element, the average distance of the cylinder to the heating element being 8 to 10 times the thickness of the cylinder wall, and heating the element until the metal in the ore is reduced.

8. A flat briquette of trapezoidal shape containing 79% calcined dolomite, 18% ferrosilicon of 75% Si, and 3% fluorspar, and having a specific gravity of 2 to 2.2.

GEORGES JULES AUGUSTE BASSEREAU.

REFERENCES CITED

The following references are of record in the file of this patent:

UNITED STATES PATENTS

| Number | Name | Date |
|---|---|---|
| 657,736 | Horry | Sept. 11, 1900 |
| 803,147 | Appleby | Oct. 31, 1905 |
| 882,733 | Appleby | Mar. 24, 1908 |
| 1,374,802 | Appleby | Apr. 12, 1921 |
| 1,392,965 | Priwer | Oct. 11, 1921 |
| 1,420,561 | Leander | June 20, 1922 |
| 1,610,809 | Newman | Dec. 14, 1926 |
| 1,636,041 | Breaker | July 19, 1927 |
| 1,867,294 | Whitacre | July 12, 1932 |
| 1,889,426 | Stout | Nov. 29, 1932 |
| 2,068,448 | Cox | Jan. 19, 1937 |
| 2,148,358 | Lang et al. | Feb. 21, 1939 |
| 2,219,614 | Berghaus et al. | Oct. 29, 1940 |
| 2,313,837 | Nissim | Mar. 16, 1943 |
| 2,325,521 | Lambert | July 27, 1943 |
| 2,337,679 | Osterberg | Dec. 28, 1943 |
| 2,355,343 | Von Zeerleder et al. | Aug. 8, 1944 |
| 2,412,582 | Hybinette et al. | Dec. 17, 1946 |

FOREIGN PATENTS

| Number | Country | Date |
|---|---|---|
| 437,333 | Great Britain | Oct. 28, 1935 |
| 432,189 | France | Sept. 29, 1911 |
| 795,721 | France | Jan. 13, 1936 |

Certificate of Correction

December 26, 1950

Patent No. 2,535,622

GEORGES JULES AUGUSTE BASSEREAU

It is hereby certified that error appears in the printed specification of the above numbered patent requiring correction as follows:

Column 3, line 18, for "a souce of heart" read *a source of heat*; column 4, line 54, for "hte" read *the*; column 5, line 5, after the word "built" insert *up*; line 16, after "centimeters" insert a period; column 7, line 22, after the word and comma "chamber," insert *an*; line 24, for "the", first occurrence, read *an*; and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*